US006524039B1

(12) United States Patent
Magnuson et al.

(10) Patent No.: US 6,524,039 B1
(45) Date of Patent: Feb. 25, 2003

(54) WHEELCHAIR RESTRAINING SYSTEM WITH REMOTELY-CONTROLLED RESTRAINING BELTS

(75) Inventors: Richard Magnuson, Kentwood, MI (US); Douglas Fassett, Kentwood, MI (US); Bernard Harold, III, Grandville, MI (US)

(73) Assignee: American Seating Company, Grand Rapids, MI (US)

(*) Notice: Subject to any disclaimer, the term of this patent is extended or adjusted under 35 U.S.C. 154(b) by 0 days.

(21) Appl. No.: 09/720,648

(22) PCT Filed: Apr. 28, 2000

(86) PCT No.: PCT/US00/08216

§ 371 (c)(1),
(2), (4) Date: Feb. 23, 2001

(87) PCT Pub. No.: WO00/66396

PCT Pub. Date: Nov. 9, 2000

Related U.S. Application Data

(60) Provisional application No. 60/131,968, filed on Apr. 30, 1999.

(51) Int. Cl.[7] .................................................. B60P 7/08

(52) U.S. Cl. ................................ 410/23; 410/4; 410/7; 410/12; 410/100

(58) Field of Search .......................... 410/3, 4, 7, 9–12, 410/19, 22, 23, 51, 100; 248/499; 296/65.04; 280/304.1; 297/DIG. 4

(56) References Cited

U.S. PATENT DOCUMENTS

| | | | | | |
|---|---|---|---|---|---|
| 4,019,752 | A | * | 4/1977 | Leon et al. | 410/7 X |
| 4,027,747 | A | * | 6/1977 | Moorman, Jr. | 410/7 |
| 4,103,934 | A | * | 8/1978 | Arnholt et al. | 410/7 X |
| 4,520,893 | A | * | 6/1985 | Keough | 410/7 X |
| 4,588,340 | A | * | 5/1986 | Howard | 410/7 |
| 4,623,289 | A | * | 11/1986 | Apostolos | 410/7 |
| 4,671,713 | A | * | 6/1987 | Lenkman | 410/7 |
| 4,729,573 | A | * | 3/1988 | Davis | 410/7 X |
| 4,886,403 | A | * | 12/1989 | Gresham | 410/10 |
| 4,995,775 | A | * | 2/1991 | Gresham | 410/10 |
| 5,026,225 | A | * | 6/1991 | McIntyre | 410/23 |
| 5,186,585 | A | * | 2/1993 | Souga et al. | 410/9 |
| 5,344,265 | A | * | 9/1994 | Ullman et al. | 410/3 |
| 5,391,030 | A | * | 2/1995 | Lee | 410/12 |
| 5,489,170 | A | * | 2/1996 | Inove et al. | 410/7 |
| 5,567,095 | A | * | 10/1996 | James et al. | 410/7 |
| 5,888,038 | A | * | 3/1999 | Ditch et al. | 410/7 |
| 6,113,325 | A | | 9/2000 | Craft | 410/7 |
| 6,149,359 | A | * | 11/2000 | Cardona | 410/11 |
| 6,287,060 | B1 | * | 9/2001 | Girardin | 410/7 |

* cited by examiner

*Primary Examiner*—Stephen T. Gordon
(74) *Attorney, Agent, or Firm*—Clark & Brody

(57) ABSTRACT

A system for restraining a wheelchair in a vehicle comprises a barrier having housings for restraining belts thereon. A remote release assembly is mounted on the barrier remote from the housing and is connected to the housing, as by a cable. The wheelchair is secured by first operating the assembly to release the belt from the housing to allow the vehicle operator to withdraw the belt from the housing and attach it to the wheelchair before the wheelchair is fully in the securing area Then, as the wheelchair is moved fully into the wheelchair area the operator again operates the remote assembly to cause the housing to retract the belt into the housing to tension the belt.

19 Claims, 4 Drawing Sheets

WHEELCHAIR RESTRAINING SYSTEM WITH REMOTELY-CONTROLLED RESTRAINING BELTS

This application claims the benefit of provisional application No. 60,131,968, filed Apr. 30, 1999.

TECHNICAL FIELD

This invention relates to systems for securing objects to mass-trasit vehicles, such as busses. In the preferred embodiment, the invention relates to a system for remote operation of restraint devices used for securing wheelchairs in busses.

BACKGROUND

A common problem in public transit is how to quickly and easily secure wheelchairs in mass-transit vehicles. A known technique for securing a wheelchair is to provide four flexible restraining belts, one for each corner of the wheelchair. To secure the wheelchair to the vehicle, each of these belts is attached to a respective corner of the wheelchair and to a respective point on the bus. This holds the wheelchair to the bus when tension is applied to the belts.

One such system is shown in U.S. Pat. No. 5,888,038. The system shown in that patent employs restraining belts that are permanently attached to a vehicle, with one of the belt housings being movable between an operational position and a storage position. Thus, in the preferred embodiment shown in that patent, two housings for restraining belts are provided at the rear of a tie-down area, and each of these belts is adapted to be attached to a respective rear corner of the wheelchair. The front belts are adapted to be attached to the front corners of the wheelchair.

While this technique provides excellent safety for the wheelchair occupant, it can be difficult to use. The difficulty in applying the belts arises because the belts must be placed in tension after attachment to the wheelchair, and it is usually difficult for the bus operator to reach the belt housings, particularly those near the wall of the bus, because the floor space allowed for the wheelchair is minimal. Thus, the driver must often bend over and reach to retrieve the belts from their storage locations to attach the belts to the wheelchair as it is moved into the securing area and then again reach the belt housings to tighten the belts after the wheelchair has been moved fully into the securing area. This latter motion often requires the operator to reach through a narrow space between a panel, or barrier at the rear of the securing area and the back of the wheelchair, a procedure that can be difficult.

SUMMARY OF THE INVENTION

In accordance with the invention, flexible-belt restraint housings are attached to a barrier commonly found on busses or to a seat that has been folded to form a barrier. The release mechanisms of the belt housings may be levers capable of remote operation by a cable or other means, and a release assembly is attached to the barrier in a location easily reached by the operator. This allows the operator to control the restraint devices from a standing or slightly stooped position. Thus, by using the arrangement of the invention, the operator need only bend over to extend and then attach the restraint belts to the wheelchair when the wheelchair is far enough from the barrier to make those operations comfortable, and then tightening or releasing the belts from a standing position.

The particular belt devices employed are preferably of the type that is locked until released by moving a release lever. When released, the belts automatically retract into the housings, for example, by a spring return known in the art.

In use, the operator moves the wheelchair passenger partially into the wheelchair location. Then, he operates the handle of the remote assembly with one hand whereby the housings release the belts. The operator holds the lever of the remote assembly with one hand and pulls the belts out to the desired length with the other. He then releases the lever, which leaves the belts at the desired length because the housings automatically lock. Then he attaches hooks on the belts to the wheelchair frame and moves the wheelchair to the final location in the securing area. He then operates the handle again allowing the belts to retract by spring retraction to tension the restraint belts.

DETAILED DESCRIPTION OF THE PREFERRED EMBODIMENT

Figure 2:
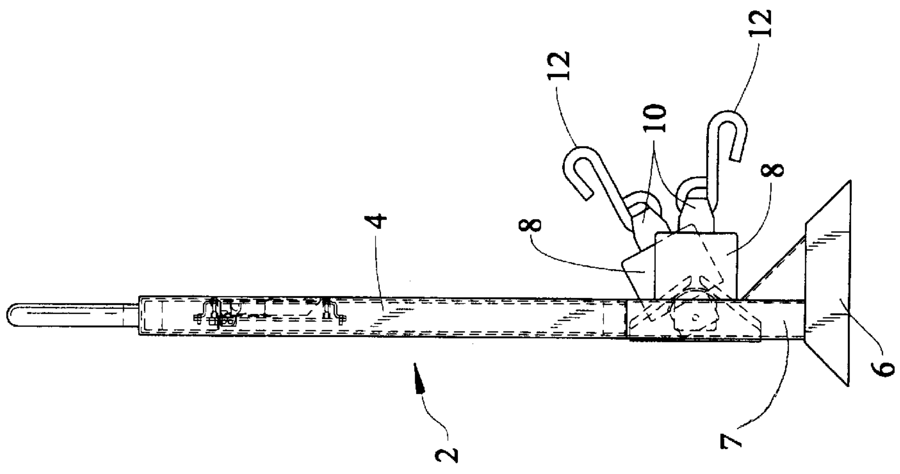
FIG. 2 is a side view of the barrier of FIG. 1.
Figure 1:
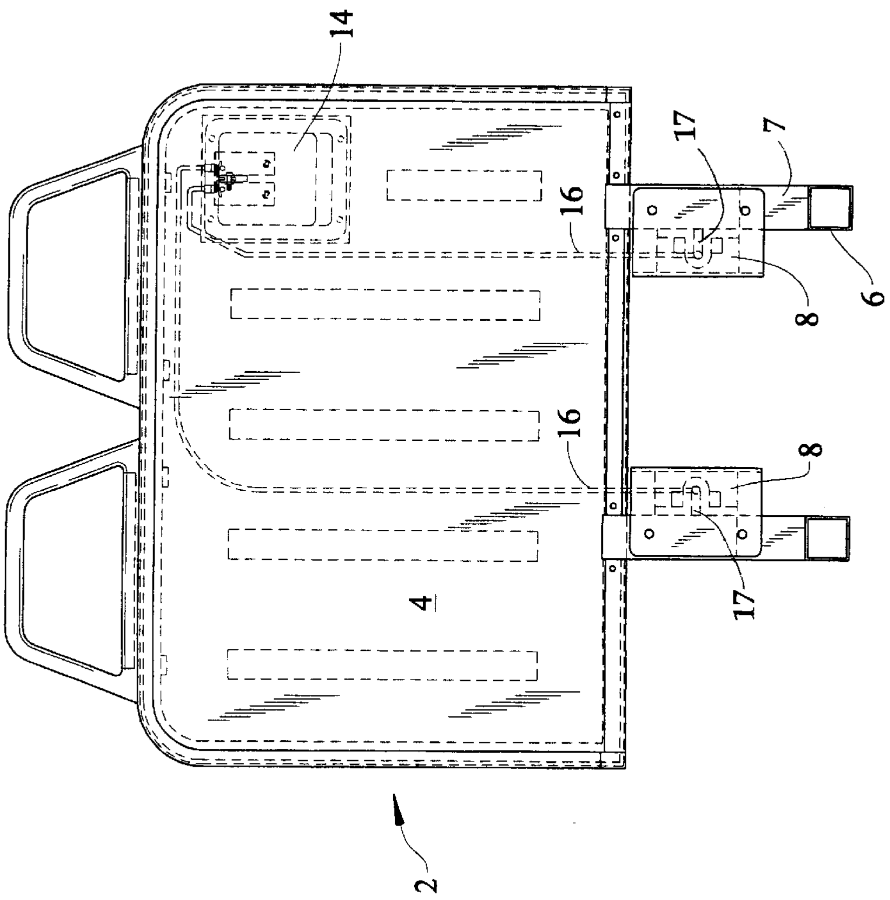
FIG. 1 is a front view of a barrier in accordance with the invention.

With reference to FIG. 1, the invention provides a barrier 2 that is configured to be placed at one end of a wheelchair tie-down, or securing, area, such as the area described further in the noted 038 patent. The barrier includes a panel 4 that serves as both a privacy screen between the securing area and other passengers and as a safety barrier for the wheelchair passenger. The barrier includes feet 6 for securely bolting the barrier to the floor of a bus, as is known in the art. The barrier further includes posts 7 extending upward from the feet, each of which has thereon a respective one of two housings 8 containing extendable wheelchair-restraining belts 10 and hooks 12 for engaging the frame of a wheelchair in the securing area. Other configurations of the feet and posts such as a curved bar or a solid panel are contemplated, The restraining belt housings are of the type that includes a locking mechanism wherein the belts are normally locked in position. The housings further include a release lever (not shown) connected to the locking mechanism that unlocks the belts when depressed and then locks the belts when released. Further, the housings include spring-activated retraction mechanisms that apply retraction tension to the belts when the release mechanism is activated to unlock the belts. Thus, the belts can be extended by activating the release lever and are retained in the extended position upon deactivating the release lever. Such housings are available in the art, and one suitable source is Indiana Mills & Manufacturing Inc.

In accordance with the invention, the barrier 2 further provides remote operation of the release levers on the housings. Thus, a remote assembly 14 is provided for allowing the vehicle operator to operate the release levers on the housings without reaching down to engage the actual levers. While the details of the remote assembly will be described in detail in connection with FIGS. 5 and 6, it should be noted at this point that the remote assembly is preferably connected to the release levers on the housing 8 by cables 16 that extend from the assembly through the interior of the barrier to release mechanisms 17 on the housings. Other structures for engaging and controlling the release mechanisms may be used, including electrical or fluid operated structures.

Figure 4:
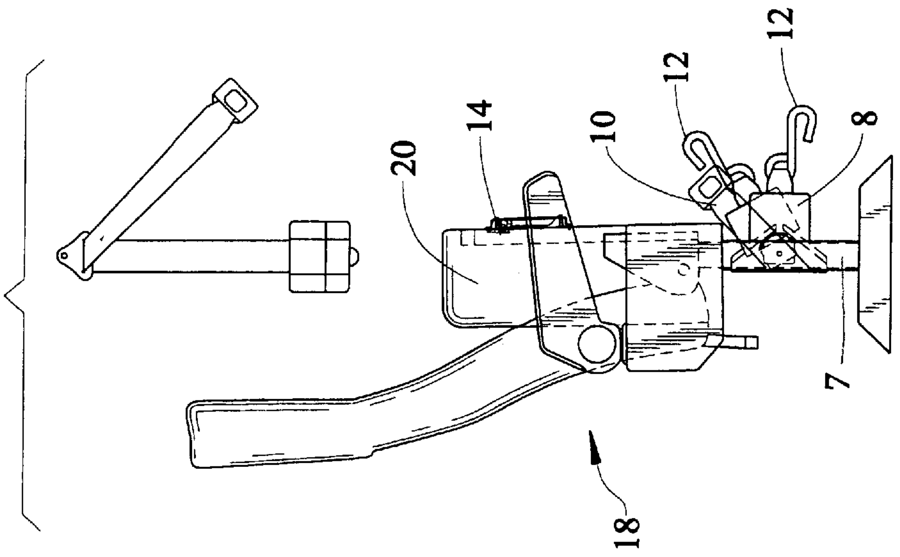
FIG. 4 is a side view of the seat of FIG. 3.
Figure 3:
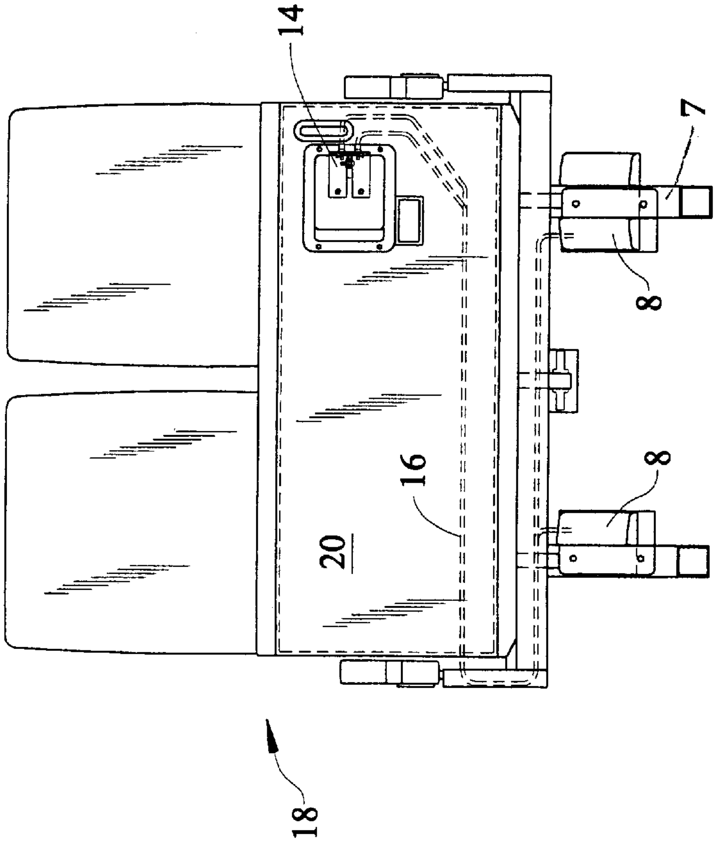
FIG. 3 is a front view of a seat folded to form a barrier in accordance with the invention.

FIGS. 3 and 4 show another embodiment of the invention wherein the barrier is a passenger seat 18 having a seat bottom portion 20 folded up to expose fully the wheelchair securing area. In this embodiment, the remote assembly 14 is located on the undersurface of the seat bottom so that it is exposed only when the seat bottom is in the raised position shown. Cables 16 pass through a cavity in the seat bottom and are connected to the release mechanisms in the housings 8.

It will be appreciated that the remote assembly may be mounted at locations other than the barrier or seat illustrated. For example, it may be mounted to other existing upstanding structures in the vehicle or to a separate structure dedicated to supporting the assembly.

The preferred structure of the remote assembly 14 will now be described with reference to FIGS. 5 and 6.

Figure 5:
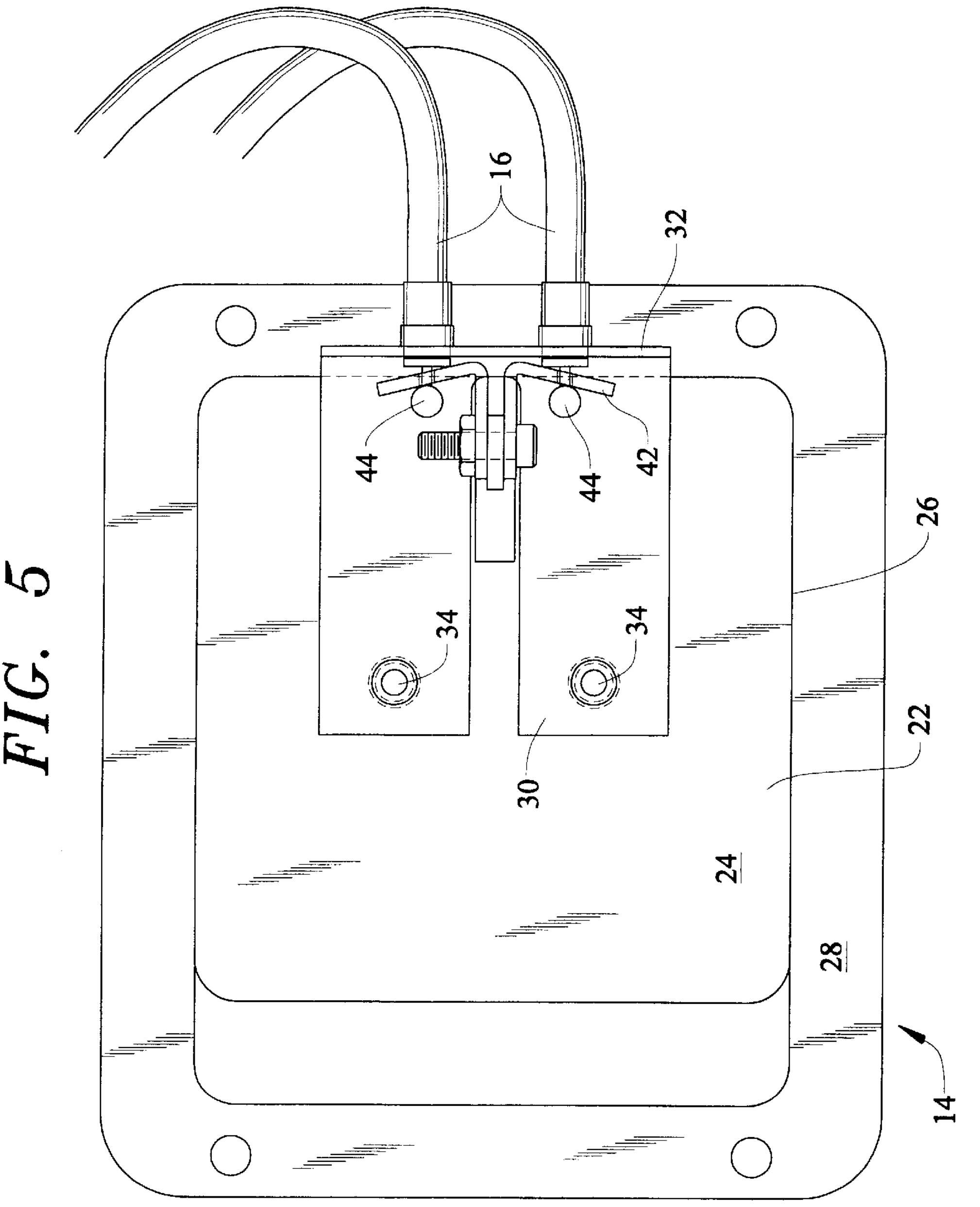
FIG. 5 is a rear view of a release assembly in accordance with the invention.

FIG. 5 is a rear view of the assembly 14, which includes a pan 22 having a bottom 24, sides 26, and edge flange 28. Cable-end mounting structure 30 is secured to the under side of the bottom 24, the mounting structure being U-shaped and providing an upstanding mounting plate 32 for securing the ends of the cables 16. The mounting structure may be attached to the bottom surface by rivets 34, as shown, or by a variety of other means, e.g., welding, cementing, screwing, etc. As well, the mounting plate may extend directly from the bottom surface.

Figure 6:
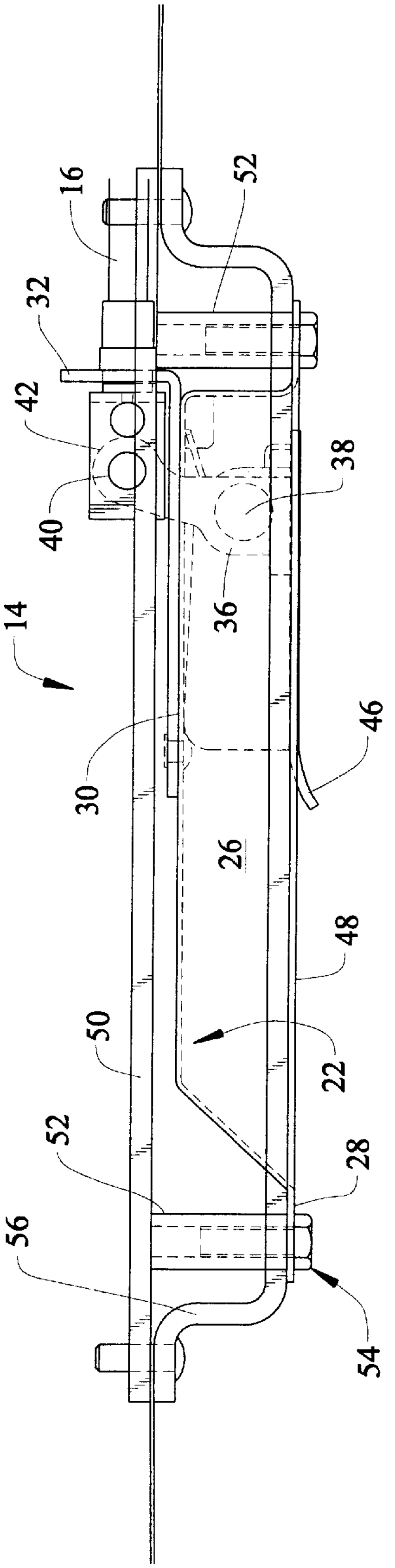
FIG. 6 is a cross section of the release assembly of FIG. 5 installed in a barrier.

With reference to FIG. 6, a release lever 36 is pivotally mounted in the cavity formed by the pan by a pivot pin 38 mounted to opposed sides 26 of the pan. One end 40 of the lever is attached to a bracket 42 that engages the balled ends 44 of the cables The bracket 42 is shown being attached to the lever by a bolt, but of course it may be attached in many different ways.

The front of the lever forms a finger pull 46, which is easily engaged by an operator to operate the lever to pull on the cables and release the locking mechanisms of the housings 8. A cover plate 48 covers the pan cavity.

In the embodiment shown, the remote assembly 14 is attached to the surface 50 of the barrier by the use of a plurality of standoffs 52. Thus, when the barrier does not have a cavity large enough to receive the pan 22 internally, the standoffs are secured to the surface by known means, and the pan is attached to the standoffs by bolts 54, which pass through the flange 28. If the panel cavity is large enough, the pan in placed in the cavity and the flange 28 is attached directly to the surface 50.

In the instances where the pan is mounted on the exterior of the barrier surface, a trim panel 56 may also be provided to enhance the appearance.

It will be appreciated that the remote assembly provides remote control of the release levers of the restraining belt housings 8. This permits the operator to release the belts with one hand by lifting the finger pull 46 and extending the belts with the other hand. This is done before the wheelchair has moved entirely into the securing area, thus not crowding the operator. When the operator has the belts in his hand he can also attach the hooks 12 to the wheelchair frame. Then, the operator again releases the locks on the housings by lifting the finger pull 46 as the wheelchair passenger moves into the securing area, thus allowing the belts to retract automatically under the spring retraction provided by the housings to adjust to the proper length. This latter operation is done with the operator standing, which obviates the necessity of leaning between the wheelchair and the barrier to tighten the belts, as in prior systems.

It will be appreciated that a unique barrier with a remote release assembly and a method for their operation has been described. Modifications within the scope of the appended claims will be apparent to those of skill in the art.

We claim:

1. Apparatus for securing a wheelchair to a vehicle comprising at least one seat belt housing adapted to be mounted to said vehicle and containing a retractable wheelchair-restraining element, an assembly connected to said housing for controlling retraction of said restraining element, and a cable connected to said housing for controlling retraction of said restraining element and operable by said assembly, wherein said assembly is remote from said housing.

2. Apparatus according to claim 1 wherein said housing is adapted to be mounted between a floor of said vehicle and said assembly.

3. Apparatus according to claim 1 further comprising a vertical barrier and wherein said assembly is mounted to said barrier.

4. Apparatus according to claim 1 further comprising a passenger seat and wherein said assembly is mounted to said seat.

5. Apparatus according to claim 1 wherein said assembly comprises a lever having one end connected to said cable.

6. Apparatus according to claim 5 wherein said lever is manually operated.

7. A system comprising an element adapted to be attached to a vehicle in a generally upstanding orientation, a housing having a retractable restraining element therein and a release mechanism, said housing being adapted to be attached to said vehicle, an assembly attached to said element at a location remote from that of said housing, and means for controlling the release mechanism extending between said assembly and said housing and operable by said assembly.

8. A system according to claim 7 wherein said housing includes a spring-activated retraction mechanism and said retractable restraining element is spring-loaded for automatic retraction into said housing upon activation of said release mechanism.

9. A system according to claim 7 wherein said means for controlling comprises a cable.

10. A system according to claim 7 wherein said element comprises a barrier.

11. A system according to claim 7 wherein said element comprises a folding passenger seat.

12. A system according to claim 11 wherein said assembly is mounted on folding part of said folding passenger seat that is on the bottom of said folding passenger seat when the folding part is in one orientation and on a vertical part of said folding passenger seat when said folding part is in a folded orientation.

13. A system according to claim 7 wherein said housing is attached to said element.

14. A system according to claim 7 in further combination with said vehicle, wherein said vehicle includes an area in which a wheelchair is to be secured, and said element is secured to said vehicle at one end of said area.

15. A system comprising a vehicle having an area in which a wheelchair is to be secured, said area having boundaries that are spaced longitudinally with respect to said vehicle, an upstanding element secured to said vehicle at one of said boundaries, a housing having a retractable restraining element therein and a release mechanism, said housing being attached to said vehicle, an assembly attaches to said element at a location remote from that of said housing, and means for controlling the release mechanism extending between said assembly and said housing and operable by said assembly.

16. A system according to claim 15 wherein said housing is mounted to said upstanding element.

17. A system according to claim 16 wherein said upstanding element is a barrier.

18. A system according to claim 16 wherein said upstanding element is a passenger seat.

19. A system according to claim 15 wherein said means for controlling comprises a cable and said assembly further comprises a lever that engages one end of said cable and is mounted to said upstanding element for pivotal motion.

* * * * *